United States Patent [19]
Knopf

[11] 3,787,808
[45] Jan. 22, 1974

[54] AUTOMOBILE SIGNALLING SYSTEM
[76] Inventor: Kenneth K. Knopf, 850 Chiltron Rd., Hillsborough, Calif. 94010
[22] Filed: Mar. 2, 1972
[21] Appl. No.: 231,432

Related U.S. Application Data
[63] Continuation of Ser. No. 883,848, Dec. 10, 1969, abandoned.

[52] U.S. Cl............... 340/66, 340/56, 340/72, 340/74, 340/81 R, 340/89, 340/107
[51] Int. Cl............................................. B60q 1/44
[58] Field of Search............ 340/66, 71, 78, 82, 262

[56] References Cited
UNITED STATES PATENTS

| | | | |
|---|---|---|---|
| 1,663,691 | 3/1928 | Everett | 340/71 |
| 1,921,833 | 8/1933 | McGorum | 340/262 |
| 1,952,133 | 3/1934 | Kovacs | 340/66 |
| 2,096,069 | 10/1937 | Seiden | 340/66 |
| 2,566,545 | 9/1951 | Alcoriza | 340/66 X |
| 2,680,843 | 6/1954 | Ford | 340/264 |
| 2,685,048 | 7/1954 | Schweitzer | 340/62 X |
| 3,395,388 | 7/1968 | Hendrickson | 340/71 |
| 3,492,638 | 1/1970 | Lane | 340/66 |

FOREIGN PATENTS OR APPLICATIONS

| | | | |
|---|---|---|---|
| 155,931 | 4/1939 | Austria | 340/71 |
| 517,275 | 10/1955 | Canada | 340/264 |
| 448,219 | 10/1927 | Germany | 340/264 |

*Primary Examiner*—Kenneth N. Leimer
*Attorney, Agent, or Firm*—Flehr, Hohbach, Test, Albritton & Herbert

[57] ABSTRACT

A signalling system for automobiles to visually warn following motorists of deceleration stages. A series of panels mounted on the rear of the automobile are illuminated by a control circuit in a predetermined program responsive to both throttling and braking operations. The control circuit is effective to actuate the panels throughout vehicle deceleration in a manner which generates signals proportioned in size, color, and intensity to the rate of change of deceleration. In one form, the circuit senses daylight intensity conditions to increase panel illumination for added signal contrast and effectiveness. In another form, the control circuit illuminates an additional information containing panel for a given time length following a deceleration stage.

4 Claims, 3 Drawing Figures

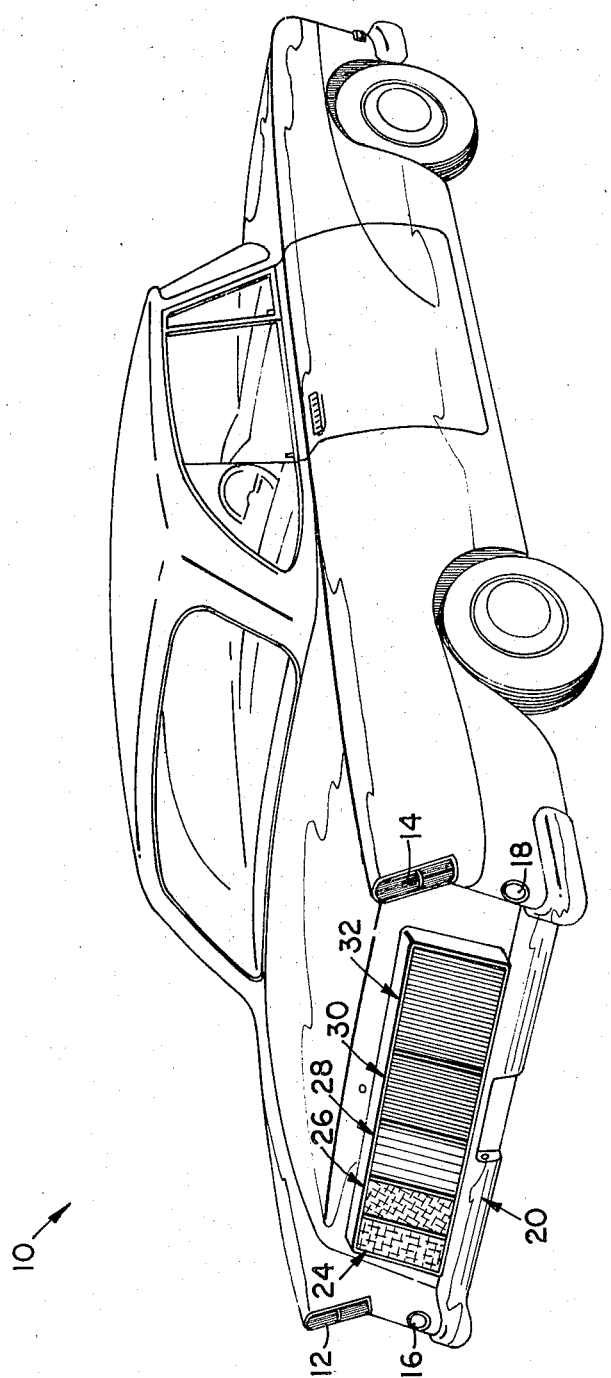
FIG_1

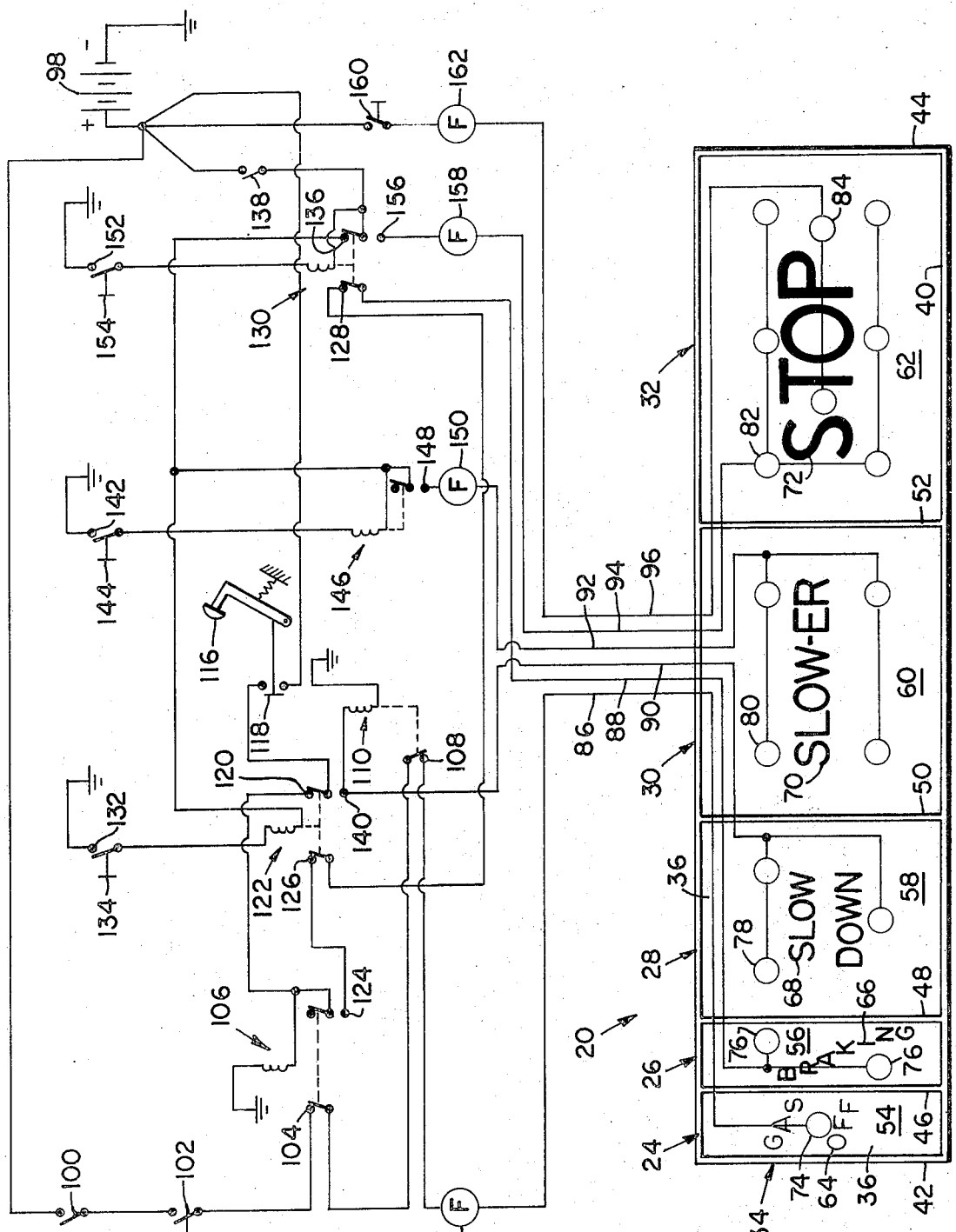

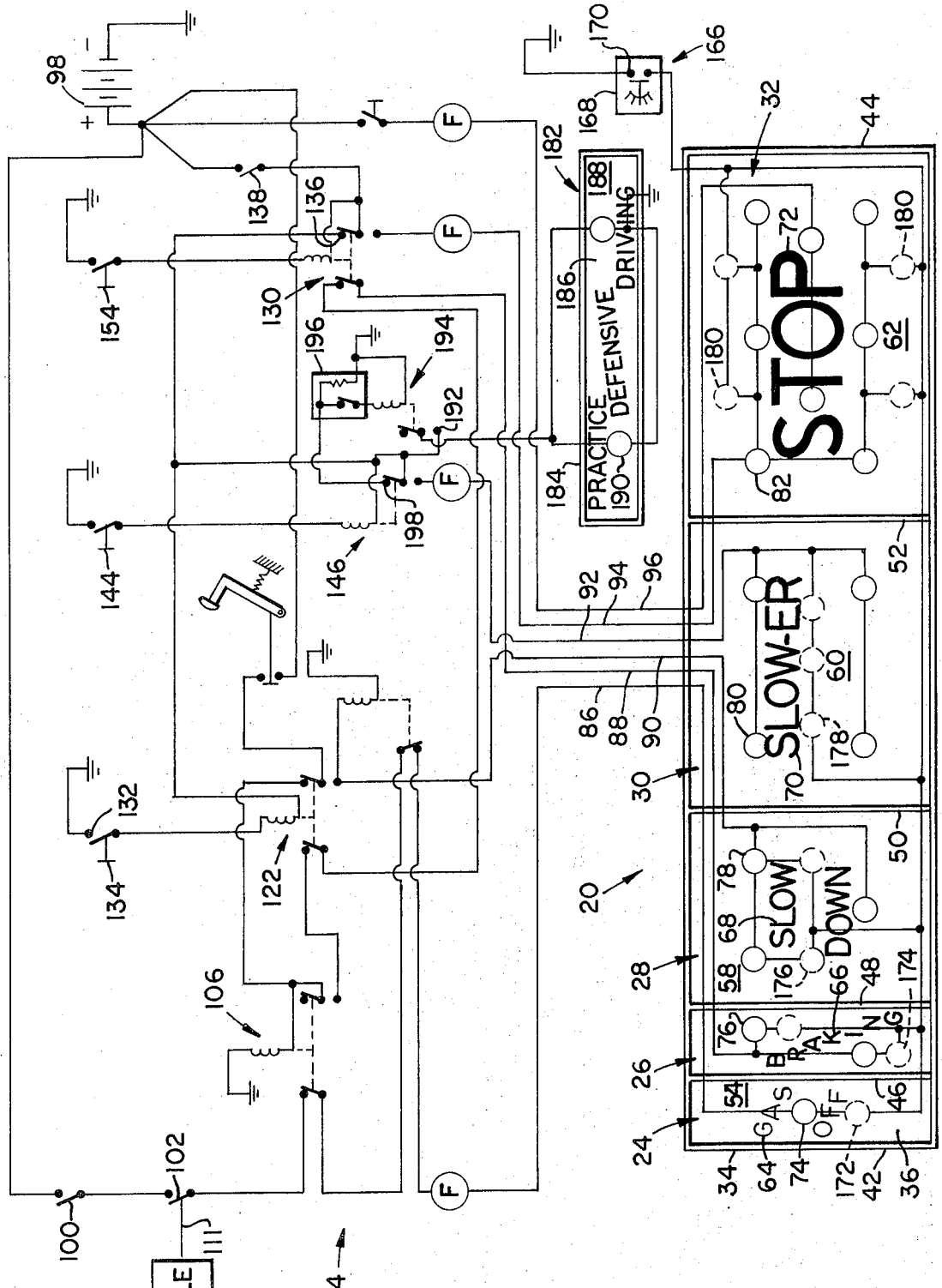

3,787,808

AUTOMOBILE SIGNALLING SYSTEM

This is a continuation, of application Ser. No. 883,848 filed Dec. 10, 1969, and now abandoned.

BACKGROUND OF THE INVENTION AND OBJECTS

This invention broadly relates to visual signalling systems for automotive vehicles and, more particularly, relates to vehicle signalling system generating a series of inter-related deceleration signals in which a following motorist can quickly and accurately evaluate the deceleration actions of the preceding vehicle.

The importance of providing an effective deceleration and stopping signalling means for automobiles has long been recognized. Present-day crowded highway conditions, high vehicle speeds, and increasing accident rates have triggered the demand for a more effective signalling system than has been provided by conventional brake lights. Previous attempts at solving these problems have not been adopted by federal or state governments in view of their many shortcomings. Conventional signalling devices of this type have either been confusing to motorists, or have not provided the full range of deceleration information required for safe driving.

Accordingly, it is an object of the invention to provide an automobile signalling system conveying information to a following motorist which is simple, easily understood, and provides the full range of deceleration information required for safe driving.

Another object is to provide a signalling system of the type described employing signalling panels automatically controlled so that the driver of the leading vehicle need not operate separate switches or observe dashboard lighting displays to thus enable him to concentrate on the safe operation of his vehicle.

Another object is to provide a visual signalling system of the type described with a plurality of progressively enlarged signalling panels, and with panel illumination progressing from the smaller to the larger throughout vehicle deceleration.

Another object is to provide an automotive signalling system with a plurality of deceleration-action signalling elements, and with each element isolated during its signalling action to enhance visual contrast.

Another object is to provide a signalling system with a plurality of deceleration-action signalling elements arranged on a vehicle in sequence so that initial deceleration action is depicted at the extreme left when viewed by the following motorist, and with the signalling progressing to the right with enlarged display area responsive to increasing rate of vehicle deceleration.

Another object is to provide a signalling system for indicating to a following motorist true vehicle deceleration action by controlling the illumination of a plurality of panels of varied size, color coding, and silhouetted words of varied size, with the illumination coordinated as deceleration progresses to indicate sequential operation of the vehicle through GAS OFF, BRAKING, SLOW DOWN, SLOW-ER, and STOP stages.

Another object is to provide a vehicle signalling system of the type described providing means sensing daylight intensity for triggering additional illumination of signalling panels for added visual contrast.

Another object is to provide a series of signalling panels conveying vehicle operating condition information to a following motorist with a safety slogan panel illuminated for a predetermined time following actuation of a selected one of the panels for educating the motoring public to become safety minded.

These and other objects and advantages of the present invention will become apparent to those skilled in the art when the following specification is read in conjunction with the accompanying drawings.

DESCRIPTION OF THE DRAWINGS

FIG. 1 is a perspective view of an exemplary vehicle provided with a signalling system incorporating features of the invention;

FIG. 2 is a schematic diagram of a control circuit of the signalling system of FIG. 1; and, FIG. 3 is a schematic diagram of a modified control circuit for the invention.

SUMMARY OF THE INVENTION

The invention provides a vehicle signalling system for effectively warning a following motorist of the range of vehicle deceleration stages from GAS OFF to STOP. A series of signalling panels mounted on the rear of the vehicle are illuminated by a control circuit in a predetermined program effective to convey information to the following motorist without confusion and with a visual display intensity proportional to the degree of deceleration rate of change. The panels are arrayed from left to right when viewed from behind with increasing size and varied color, and descriptive words in silhouette are provided on each panel for a clear indication of vehicle operation. Panel illumination is sequenced by the control circuit so that for a given operating condition only the pre-selected panel or panels are illuminated to avoid confusion.

In one form additional illumination is provided for added contrast by a control circuit automatically sensing daylight intensity. In another form an added panel incorporating a safety slogan is illuminated for a predetermined time following deactuation of a selected one of the main panels.

Operation of the signalling system progresses from an initial GAS OFF stage with a first panel of given color and indicia illuminated, to an initial BRAKING stage with a second panel of varied color and indicia illuminated, while the first panel is turned off, to a SLOW DOWN deceleration stage with a third panel of enlarged size and viared color and indicia illuminated, and with the first and second panel turned off, to a SLOW-ER deceleration stage with a fourth enlarged panel of varied color and indicia under flashing illumination, while the third panel remains on, and to a STOP stage with a fifth enlarged panel of varied color and indicia illuminated while the third and fourth panels are turned off.

DESCRIPTION OF THE PREFERRED EMBODIMENTS

Referring to the drawing, and particularly to FIG. 1, an exemplary automobile vehicle incorporating features of the invention is illustrated generally at 10. Vehicle 10 incorporates the usual red running lights 12, 14 and left and right turn signal lights 16, 18. A preferred five-compartmented signalling light box 20 incorporating features of the invention is mounted at a convenient location at the rear of the vehicle for unobstructed viewing by a following motorist. Signalling box 20 provides a sequence of illuminated lights of varied color, illumination area, indicia, intensity, and either flashing or full-on operation responsive to vehicle slowing or deceleration in a pre-determined program influenced by control circuit 22 of FIG. 2.

Signalling box 20 comprises five individual panels positioned side-by-side across the rear of the vehicle. The panels are preferably arrayed from left to right, as viewed by a following motorist, for indicating the progressing deceleration stages of vehicle 10. Each panel carries indicia which, when illuminated, indicate to the following motorist the corresponding stage of vehicle deceleration. Thus, a "GAS OFF" panel 24 is the initial panel at the left of the box, panel 26 is the "BRAKING" panel, panel 28 is the "SLOW DOWN" panel, panel 30 is the "SLOW-ER" panel, and panel 32 is the "STOP" panel. While the number of panels is shown as five, it is understood that added panels can be provided to indicate additional operating conditions of the vehicle, or one or more of the panels could be combined, as desired. Also, while the panel sequencing is from left to right in the preferred form it is understood that this direction could be reversed, or it could start in the center and go to the right and to the left simultaneously.

Signalling box 20 includes a rectangular casing or housing 34 including a rear mounting plate 36 carrying top wall 38, bottom wall 40, side walls 42, 44, and a plurality of partitions 46-52 defining the five panels. The partitions are spaced apart in a pattern with panels 24 and 26 of identical rectangular areas while panels 28-32 each have a progressively increasing area. While the panels are shown as rectangular or square, it is contemplated that other shapes could be employed, such as triangular or the like. Also, relative panel area could be varied from the illustrated embodiment as desired.

Front walls or windows 54-62 of the panels preferably comprise translucent or semi-transparent plates of a colored material such as glass or plastic effective to transmit light from within each panel for silhouetting lettering 64-72 provided on the inner surfac of each window. Preferably, the different windows are colored in a pattern enabling the following motorist to easily correlate the illuminated color with the corresponding deceleration stage of the vehicle. Thus, the GAS OFF window 54 coloration can preferably be yellow, the BRAKING window 56 coloration can be amber, the SLOW DOWN window 58 coloration can be pink, the SLOW-ER window 60 coloration can be red, and the STOP window 62 coloration can be red. It is understood that the sequencing of these colors, or variations thereof, may be varied as desired, or as may be required by applicable state or federal vehicle laws.

The lettering or indicia 64-72 is preferably applied to the inside of each window 54-62 to spell out the appropriate words when illuminated from behind. With no illumination in a compartment the words are no longer silhouetted and do not stand out. Otherwise, a following motorist could be confused by a display of many different words.

The panels are illuminated through operation of control circuit 22 adapted to energize the lamps or bulbs 74-82 mounted on mounting plate 36 behind the windows within respective panels. The ground connections for these lamps are not shown for purposes of clarity. Preferably, the illumination intensity increases from left to right, as observed by a following motorist, from panel-to-panel by providing additional lamps in parallel connection. Thus, panel 24 has only the lamp 74, panel 26 has two amps 76, panel 28 has three lamps 78, panel 30 has four lamps 80, and panel 32 has six lamps 82 for an emergency stop stage, and an additional pair of lamps 84 for a disabled vehicle stop stage. It is understood that the number of additional lamps provided in respective panels may be varied according to the desired illumination intensity, or for the advantages of safety and reliability. The number of lamps in each panel may be selected to provide a unit area illumination of equal intensity for each panel so that total panel illumination depends solely on increasing area. Also, the invention contemplates that additional lamps may be provided so that unit area illumination intensity increases from panel-to-panel in addition to the increase in total panel area.

Control circuitry 22 includes a first circuit conductor 86 to energize lamp 74 of GAS OFF panel 24, a second circuit 88 to energize lamps 76 of BRAKING panel 26, a third circuit 90 to energize lamps 78 of SLOW DOWN panel 28, a fourth circuit 92 to energize lamps 80 of SLOW-ER panel 30, a fifth circuit 94 to energize lamps 82 of STOP panel 32, and a sixth circuit 96 to energize lamps 84 of the STOP panel.

Circuit 86 is connected to electrical power source or battery 98 through speed switch 100, throttle-operated switch 102, normally closed contacts 104 of relay 106, normally closed contacts 108 of relay 110, and a conventional flasher device 112 adapted to intermittently open and close the circuit. Speed switch 100 is conventional and is connected by suitable means, such as through the engine transmission or the like. to open and close responsive to vehicle speed. Preferably switch 100 is adapted to close above a given vehicle speed, such as 30 mph, and to open when the vehible speed drops below a lower speed value, such as 22 mph. Switch 100 functions to open circuit 86 below the lower speed value to preclude panel 24 operation at slow speeds, such as during the constant starting and stopping of city driving.

Switch 102 is connected by a suitable mechanical linkage 111 to engine throttle 114 and is normally closed when the throttle is not operated or is released beyond a predetermined throttle position or power control setting. The linkage to switch 102 could also be connected directly to the accelerator pedal linkage, as desired.

Assuming that the vehicle is moving at sufficient speed for closing speed switch 100, and with the throttle operated for opening switch 102, the first stage of deceleration is initiated when the operator removes his foot from the accelerator pedal or releases the throttle beyond the predetermined position or power control setting, thereby closing switch 102. Frictional drag from the transmission and engine will effect the vehicle deceleration along level ground roadways. With both switches 100 and 102 closed, circuit 86 is completed through normally closed contacts 104, 108 and flasher 112 to lamp 74 which illuminates panel 24 for silhouetting the GAS OFF indicia through the surrounding yellow window 54. This immediately advises the following motorist that the vehicle is in the first stage of deceleration. The flashing GAS OFF signal continues as long as vehicle speed does not drop below the preferred lower limit of 22 mph, or if the driver does not operate brake pedal 116. If the speed drops below 22 mph switch 100 will open circuit 86 to de-energize lamp 74 and terminate the signal in panel 24, thus permitting low speed vehicle operation without the confusion which would result from frequent operation of panel 24 at these lower speeds.

The second stage of vehicle deceleration is initiated when the vehicle braking means is operated through a first predetermined increment as the operator applies an initial pressure to depress brake pedal 116 a short distance, such as a fraction of an inch. Pedal 116 is operatively connected with normally open switch 118 which, when closed by the initial movement of the pedal, completes a circuit through normally closed contacts 120 of relay 122 to energize relay 106. Energization of relay 106 opens contact 104 to open circuit 86 and terminate illumination of panel 24, and at the same time closes its associated contact 124 to close circuit 88 for operating braking panel 26. Circuit 88 is closed to lamps 76 through brake pedal switch 118, normally closed contact 120 of relay 122, contact 124 of relay 106, normally closed contact 126 of relay 122, and normally closed contact 128 of relay 130. Illumination of lamps 76 behind amber window 56 silhouettes the word BRAKING signalling the following motorist that the vehicle is in its second stage with a higher rate of deceleration. This signal will continue as long as the brake pedal is depressed upon the amount required to close the circuit 88. If the brake pedal is released to open switch ₋circuit 88 is opened to de-energize panel 26, and at the same time de-energize relay 106 to return switch 104 to its normally closed position. With throttle 114 in its released position and assuming that vehicle speed is sufficient to close speed switch 100, circuit 86 is again closed to energize GAS OFF panel 24.

The third deceleration stage occurs as the braking means is operated through a second predetermined increment and is initiated when brake pedal 116 is depressed beyond its initial travel so that brake fluid pressure rises a sufficient amount to close the normally open contact 132 of a conventional pressure responsive switch 134 suitably arranged in the hydraulic brake circuit.

Third circuit 90 is closed when fluid brake pressure rises within a pre-selected range of, for example, between 3-15 psi. This pressure closes contact 132 of switch 134 which energizes relay 122 through normally closed contact 136 of relay 130 and ignition switch 138. Relay 122 closes its associated normally open contact 140 completing the third circuit from brake switch 118 to lamps 78 of panel 28. Illumination of the pink window 58 by the lamps silhouettes the words SLOW DOWN, thus signalling the following motorist that the vehicle operator has now the third stage of deceleration, and that the rate of deceleration is higher. This signalling will continue as long as brake pressure is within the pre-determined range of 3-15 psi and until it reaches a pressure sufficient to close the normally open contact 142 of switch 144.

To eliminate confusion of the signals for the following motorist, circuitry 22 includes means for insuring that panels 24 and 26 are not illuminated during the third deceleration stage. First circuit 86 is opened when contact 140 of relay 122 is closed, thus energizing relay 110 to effect opening its associated contact 108. This serves to open circuit 86 which otherwise would be closed when contact 104 is closed as relay 106 is de-energized following the opening of contact 120 of relay 122. Second circuit 88 to the BRAKING panel 26 is opened at this time when contacts 126 and 120 of relay 122 are opened, and also as a result of contact 124 of relay 106 opening.

The fourth stage of deceleration occurs when the braking means is operated through a third predetermined increment as pedal 116 is depressed further to increase brake fluid pressure within a higher range of, for example from 15-50 psi. A fluid pressure within this range will close normally open contact 142 of conventional pressure responsive switch 144 for energizing relay 146 through normally closed contacts 136 of relay 130 and through initial switch 138. This close normally open contact 148 of relay 146 completing fourth circuit 92 through ignition switch 138, contacts 136 of relay 130, flasher switch 150, and lamps 80 of panel 30. The lamps then illuminate red-colored window 60 and silhouette the word "SLOW-ER" signalling the following motorist that the vehicle operator has now initiated the fourth stage of deceleration and that the rate of deceleration has increased. As lamps 80 flash on and off SLOW DOWN panel 28 remains illuminated so that the combined signals of the steady SLOW DOWN panel 28 and flashing SLOW-ER panel 30 operate together to provide added warning to the following motorist. At the same time, GAS OFF panel 24 and BRAKING panel 26 remain de-energized as in the third deceleration stage. The combined signalling will continue as long as brake pressure remains within the pre-determined range of 15-50 psi.

The fifth deceleration stage occurs when the braking means is operated through a fourth predetermined increment upon a further depression of brake pedal 116 in an emergency-stop manner increasing brake pressure within a higher pre-determined range of, for example, 50 psi and above. This pressure closes normally open contact 152 of conventional pressure responsive switch 154 energizing relay 130 through ignition switch 138. Normally open contact 156 of relay 130 closes to close circuit 94 through ignition switch 138, flasher switch 158, and lamps 82 of panel 62. The flashing lamps illuminate red window 62 silhouetting the word STOP signalling the following motorist that the vehicle is in its fifth stage of maximum, emergency deceleration.

During the emergency stop control circuitry 22 further de-energizes panels 28 and 30 to avoid confusing the following motorist. This occurs as contact 136 of relay 130 is opened for de-energizing relay 146, and in turn open contact 148 in fourth circuit 92. At the same time, the opening of contact 136 de-energizes relay 122 which in turn opens its associated contact 140 for opening third circuit 90 of panel 28. Opening of contact 128 of relay 130 opens second circuit 88 for BRAKING panel 26. This insures that panel 26 remains de-energized as contacts 120 and 126 of relay 122 close. First circuit 86 of panel 24 also remains open as a result of the opening of contact 104 when relay 106 is energized as a result of the closing of contact 120 in relay 122. Otherwise, the first circuit would prematurely close when contact 108 closes when relay 110 is de-energized as a result of the opening of contact 140.

A sixth circuit 96 is provided for intermittent flashing of STOP panel 32 such as when the vehicle is stalled or disabled, A manually operated dashboard mounted swtich 160, when energized, completes the circuit through flasher switch 162 for illuminating an additional pair of lamps 84 in panel 32. Circuit 96 operates independently of the other signalling circuits.

Referring to FIG. 3 a modified control circuit 164 is illustrated for operating signalling box 20. In the figure like numerals refer to like elements of FIG. 2.

The control circuitry 164 of FIG. 3 includes a light intensity compensating circuit 166 adapted to automatically provide added panel illumination as required, such as during daylight hours when the contrast provided by the lamps of the main circuits is not sufficient for adequate signalling. Compensating circuit 166 includes a conventional photocell operated switch 168 sensing outside light intensity and adapted to close contacts 170 above a predetermined light intensity requiring added panel illumination for safe driving. A plurality of additional lamps 172–180 are provided in respective panels 24–32 in parallel circuit connection with respective lamps 74–82. The number of additional lamps 172–180 provided in the panels preferably corresponds to the illumination provided by the main circuit lamps in each panel. Thus, the number of lamps generally increases in each panel progressing left to right. In operation, when the surrounding light intensity increases during daylight hours above the predetermined level photocell switch 168 closes contacts 170 completing the circuit to ground for the additional lamps. The additional lamps in each panel are illuminated only when the corresponding circuits 86–94 are energized as deceleration progresses. The added illumination of lamps 172–180 combined with that of the main circuit lamps provides an added contrast for signalling the following motorist. When outside light intensity drops in the hours of darkness photocell switch 168 for deactivating the additional lamps.

The modified circuitry of FIG. 3 further includes an additional panel 182 mounted on the rear of the vehicle 10 in a convenient location for viewing by the following motorist. Panel 182 preferably comprises a rectangular housing 184 with a rear support wall 186 and window 188 of a suitable transparent or semi-opaque material such as purple or light green colored glass or plastic. Any desired mass education safety slogan such as "PRACTICE DEFENSIVE DRIVING" or "FASTEN SEAT BELTS" is provided on the inside surface of window 188. Window 188 is preferably removably mounted on housing 184 to facilitate changing the slogan from time to time. A pair of lamps 190 are mounted within panel 182 on wall 186 for silhouetting the slogan. The lamps 190 are connected in a parallel circuit between a common ground and with normally open contact 192 or relay 194. Relay 194 is actuated by normally closed time delay switch 196 preferably of the bi-metallic heater element type, connected between ground and normally closed contact 198 of relay 146.

When ignition switch 138 is first closed, a circuit is established through contact 136 of relay 130 and contact 198 of relay 146 to energize the heater of time delay switch 196. At the same time, relay 194 is activated to close its associated contact 192 and illuminate panel 182. After a preset time period of, for example, sixty seconds delay switch 196 opens to deactivate relay 194 and panel 182.

During activation of the SLOW-ER panel 30 by operation of switch 146, relay 196 opens its associated contact 198. This de-energizes delay switch 196 which closes after a preset time period of, for example, two seconds to condition the panel 182 circuit for operation following each deactivation of panel 30. As switch 144 opens, contact 198 of relay 146 returns to its normally closed position establishing a circuit into a delay switch 196 to activate relay 194, which in turn closes contact 192 to illuminate the slogan in panel 182. The panel remains on throughout the 60-second time delay until the heater of switch 196 opens the circuit to relay 194.

While the circuit for additional panel 182 has been shown as connected for operation in conjunction with fourth circuit 92 of panel 30, it is also contemplated that the panel 182 circuit can be similarly connected with any of the remaining circuits 86–94 for displaying the safety slogan following a respective vehicle deceleration stage.

While the foregoing embodiments are considered to be preferred it is understood that numerous variations and modifications may be made therein by those skilled in the art without departing from the spirit and scope of the invention as expressed in the appended claims.

I claim:

1. In combination with a motor vehicle having braking means controlled by operator actuation of a brake member and which when released moves to a position in which no braking is applied and also having motor speed control means including a throttle member movable to vary the speed of the vehicle and which when released by the operator moves to a released position, deceleration of the vehicle normally involving release of the throttle member followed by initial movement of the brake member from its released position and then braking of the vehicle by application of force to the brake member after such initial movement; a visual signalling system comprising a plurality of light transmitting panels mounted on the rear of the motor vehicle forming first, second and third display areas, first, second and third lamp means adapted to separately illuminate the corresponding panels, said panels being disposed side by side in sequence and being characterized whereby they are visually distinguishable when illuminated, electrical circuitry means including a source of current and first, second and third circuits connected respectively to the first, second and third lamp means for energizing the same, first switch means actuated by release of the throttle member and serially included in said first circuit, second switch means actuated by initial movement of the brake member and included in series with the second circuit, third switch means actuated when force is applied to the brake member to effect braking of the vehicle and connected in series with the third circuit, actuation of said first switch means by release of the throttle member serving to close the first circuit to energize the first lamp means to illuminate the first panel, actuation of the second switch means by initial movement of the brake member from its released position serving to close the second circuit to energize the second lamp means to illuminate the second panel, and application of force to the brake member by the operator serving to actuate the third switch means to close the third circuit to energize the third illuminating means, and relay means in the circuitry serving to open the first circuit when the second circuit is closed and for opening both first and second circuits when the third circuit is closed.

2. A signalling system as in claim 1 together with means for opening said first circuit to prevent energization of the first lamp means when the speed of the vehicle is below a predetermined value.

3. A signalling system as in claim 1 in which the light transmitting panels include a panel forming a fourth display area, fourth lamp means adapted to separately illuminate the fourth panel, the electrical circuitry including a fourth circuit connected to the fourth lamp means, fourth switch means adapted to be actuated when force is applied to the brake member in excess of that applied to actuate the third switch means, the fourth switch means being connected in series with the fourth circuit, actuation of the fourth switch means serving to energize the fourth lamp means to illuminate the fourth panel while the first and second circuits remain open.

4. A system as in claim 3 in which the light transmitting panels include a fifth panel forming a fifth display area together with fifth lamp means adapted to illuminate the same, the electrical circuitry including a fifth circuit connected with the fifth lamp means to energize the same, a fifth switch means actuated when force is applied to the brake member in excess of that required to actuate the fourth switch means, as in emergency braking, the fifth switch means being connected in series with the fifth circuit, actuation of the fifth switch means serving to energize the fifth lamp means and thereby illuminate the fifth panel, and relay means in the circuitry for maintaining the first, second, third and fourth circuits open while the fifth circuit remains closed to illuminate the fifth panel.

* * * * *